(12) United States Patent
Abramovici

(10) Patent No.: US 11,404,959 B2
(45) Date of Patent: *Aug. 2, 2022

(54) DC/DC POWER CONVERTER

(71) Applicant: Tal Abramovici, Nes Ziona (IL)

(72) Inventor: Tal Abramovici, Nes Ziona (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/339,955

(22) Filed: Jun. 5, 2021

(65) Prior Publication Data

US 2021/0296984 A1  Sep. 23, 2021

Related U.S. Application Data

(63) Continuation of application No. 16/693,321, filed on Nov. 24, 2019, now Pat. No. 11,139,734, which is a continuation-in-part of application No. PCT/IL2018/051276, filed on Nov. 25, 2018.

(51) Int. Cl.
| | |
|---|---|
| *H02M 3/335* | (2006.01) |
| *H02M 1/00* | (2006.01) |
| *H02M 7/10* | (2006.01) |
| *H02M 7/06* | (2006.01) |
| *H02M 3/07* | (2006.01) |
| *H02M 3/158* | (2006.01) |

(52) U.S. Cl.
CPC .......... *H02M 3/07* (2013.01); *H02M 3/1588* (2013.01); *H02M 3/33569* (2013.01); *H02M 3/33576* (2013.01); *H02M 1/0058* (2021.05)

(58) Field of Classification Search
CPC ......... H02M 3/33569; H02M 3/33571; H02M 3/33573; H02M 1/0058
See application file for complete search history.

(56) References Cited

U.S. PATENT DOCUMENTS

| | | | | |
|---|---|---|---|---|
| 7,859,870 | B1* | 12/2010 | Schutten | H02M 3/337 363/56.02 |
| 9,831,787 | B1* | 11/2017 | Halberstadt | H02M 3/33569 |
| 11,139,734 | B2* | 10/2021 | Abramovici | H02M 3/1588 |
| 2011/0317452 | A1* | 12/2011 | Anguelov | H02M 3/33592 363/21.02 |
| 2013/0265804 | A1* | 10/2013 | Fu | H02M 3/33576 363/17 |
| 2014/0133190 | A1* | 5/2014 | Asinovski | H02M 3/3382 363/21.03 |
| 2014/0198536 | A1* | 7/2014 | Fu | H02M 1/14 363/17 |

(Continued)

FOREIGN PATENT DOCUMENTS

| | | | | |
|---|---|---|---|---|
| CN | 103329420 B | * | 12/2015 | ........ H02M 3/33507 |
| WO | WO-2011113960 A2 | * | 9/2011 | ............ H02M 3/337 |
| WO | WO-2017049179 A1 | * | 3/2017 | ........ H02M 3/33507 |

*Primary Examiner* — Sisay G Tiku

(57) ABSTRACT

A DC-DC power converter including: input terminals for receiving an input voltage; a pulse wave generator for generating a pulse wave; a transformer having a primary winding and a secondary winding and a magnetizing inductance; a DC blocking capacitor; a rectifier; a filter capacitor; at least one resonant inductor connected in series with the transformer; a resonant capacitor connected to the rectifier; output terminals; and a control unit for controlling operation of the pulse wave generator such when the duty cycle of the pulse wave voltage varies, high efficiency is maintained.

8 Claims, 14 Drawing Sheets

(56) References Cited

U.S. PATENT DOCUMENTS

| | | | |
|---|---|---|---|
| 2014/0247625 A1* | 9/2014 | Hosotani | H02M 3/33507 363/21.02 |
| 2014/0254203 A1* | 9/2014 | Dai | H02M 3/33573 363/17 |
| 2014/0254208 A1* | 9/2014 | Dai | H02M 3/335 363/21.02 |
| 2017/0025962 A1* | 1/2017 | Davidson | H02M 1/42 |
| 2018/0248489 A1* | 8/2018 | Wang | H02M 7/217 |
| 2019/0199202 A1* | 6/2019 | Davidson | H02M 1/4208 |
| 2020/0177073 A1* | 6/2020 | Davidson | H02M 1/4241 |

* cited by examiner

DC/DC POWER CONVERTER

FIELD OF THE INVENTION

The present invention relates to DC/DC converters, more particularly, to a DC/DC power converter.

BACKGROUND OF THE INVENTION

DC/DC converters typically receive an input voltage from a voltage source and produce a DC output voltage at their output. Input voltages provided by those voltage sources may vary widely. Furthermore, the desired DC output voltage may be variable over a certain range rather than fixed to a certain value, in accordance with the particular application of the converter. For example, the DC output voltage may range from 250V to 410V (e.g. for Lithium-ion battery charger). Therefore, it is generally desired for DC/DC converters to provide output regulation over wide load and line variations, while preserving high efficiency.

SUMMARY OF THE INVENTION

In a first aspect of the present invention, there is provided a DC/DC power converter comprising: input terminals being connected to receive an input voltage;

a pulse wave generator comprising of a plurality of switches being arranged in a bridge configuration, to generate a pulse wave voltage from the input voltage;

a transformer comprising a primary winding, a secondary winding and a magnetizing inductance in parallel with the primary winding;

a DC blocking capacitor connected in series with said primary winding, and their series connection is coupled to receive the pulse wave voltage;

at least one resonant inductor connected in series with the secondary winding;

a filter capacitor connected in series with the series connection of the secondary winding and the at least one resonant inductor;

a rectifier being connected in series between the filter capacitor and the series connection of the secondary winding and the at least one resonant inductor;

a resonant capacitor being either connected in parallel with the rectifier, or connected in parallel with the series connection of the rectifier and the filter;

output terminals being connected across the filter capacitor; and a control unit configured to: (i) operate the plurality of switches at a constant frequency with complementary duty cycles D and (1-D), under ZVS condition, such that the duty cycle of the pulse wave voltage is D; and (ii) vary the duty cycle D within a duty cycle range in which the fall transitions of the pulse wave voltage occur while the rectifier is conducting and the rise transitions of the pulse wave voltage occur while a reverse voltage across the rectifier is resonantly falling from a ringing peak, thus causing an output power across the output terminals to responsively vary in positive correlation.

In some embodiments of the first aspect of the present invention, the at least one resonant inductor is integrated with the transformer.

In some embodiments of the first aspect of the present invention, the rectifier is a switch being operated as a synchronous rectifier.

In some embodiments of the first aspect of the present invention, the rectifier is a diode.

In a second aspect of the present invention, there is provided a DC/DC power converter comprising: input terminals being connected to receive an input voltage;

a pulse wave generator comprising of a plurality of switches being arranged in a bridge configuration, to generate a pulse wave voltage from the input voltage;

a transformer comprising a primary winding, a secondary winding and a magnetizing inductance in parallel with the primary winding;

at least one resonant inductor connected in series with the primary winding;

a DC blocking capacitor connected in series the series connection of the primary winding and the at least one resonant inductor, and the series connection of the DC blocking capacitor, the primary winding and the at least one resonant inductor is coupled to receive the pulse wave voltage;

a filter capacitor connected in series with the secondary winding;

a rectifier being connected in parallel with the series connection of the filter capacitor and the secondary winding;

a resonant capacitor being either connected in parallel with the rectifier, or connected in parallel with the transformer;

output terminals being connected across the filter capacitor; and a control unit configured to: (i) operate the plurality of switches at a constant frequency with complementary duty cycles D and (1-D), under ZVS condition, such that the duty cycle of the pulse wave voltage is D; and (ii) vary the duty cycle D within a duty cycle range in which the fall transitions of the pulse wave voltage occur while the rectifier is conducting and the rise transitions of the pulse wave voltage occur while a reverse voltage across the rectifier is resonantly falling from a ringing peak, thus causing an output power across the output terminals to responsively vary in positive correlation.

In some embodiments of the second aspect of the present invention, the at least one resonant inductor is integrated with the transformer.

In some embodiments of the second aspect of the present invention, the rectifier is a switch being operated as a synchronous rectifier.

In some embodiments of the second aspect of the present invention, the rectifier is a diode.

In a third aspect of the present invention, there is provided a DC/DC power converter comprising: input terminals being connected to receive an input voltage;

a pulse wave generator comprising of a plurality of switches being arranged in a bridge configuration, to generate a pulse wave voltage from the input voltage;

a transformer comprising a primary winding, a secondary winding and a magnetizing inductance in parallel with the primary winding;

at least one resonant inductor connected in series with the primary winding;

a DC blocking capacitor connected in series the series connection of the primary winding and the at least one resonant inductor, and the series connection of the DC blocking capacitor, the primary winding and the at least one resonant inductor is coupled to receive the pulse wave voltage;

at least one further inductor connected in series with the secondary winding;

a filter capacitor connected in series with the series connection of the secondary winding and the at least one further inductor;

a rectifier being connected in series between the filter capacitor and the series connection of the secondary winding and the at least one further inductor;

a resonant capacitor being either connected in parallel with the rectifier, or connected in parallel with the series connection of the rectifier and the filter;

output terminals being connected across the filter capacitor; and a control unit configured to: (i) operate the plurality of switches at a constant frequency with complementary duty cycles D and (1-D), under ZVS condition, such that the duty cycle of the pulse wave voltage is D; and (ii) vary the duty cycle D within a duty cycle range in which the fall transitions of the pulse wave voltage occur while the rectifier is conducting and the rise transitions of the pulse wave voltage occur while a reverse voltage across the rectifier is resonantly falling from a ringing peak, thus causing an output power across the output terminals to responsively vary in positive correlation.

In some embodiments of the third aspect of the present invention, the rectifier is a switch being operated as a synchronous rectifier.

In some embodiments of the third aspect of the present invention, the rectifier is a diode.

In some embodiments of the third aspect of the present invention, the DC/DC power converter further includes a first doubling diode, a second doubling diode and a doubling capacitor; the first doubling diode is connected in series between the rectifier and the second doubling diode; the series connection of the first doubling diode and the second doubling diode being connected in parallel with the output terminals; the doubling capacitor is connected in parallel with the series connection of the first doubling diode and the rectifier.

In some embodiments of the third aspect of the present invention, the pulse wave generator is a half bridge inverter.

In some embodiments of the third aspect of the present invention, the pulse wave generator is a full bridge inverter.

BRIEF DESCRIPTION OF THE DRAWINGS

The invention may be more clearly understood upon reading of the following detailed description of non-limiting exemplary embodiments thereof, with reference to the following drawings, in which.

DESCRIPTION OF THE PREFERRED EMBODIMENTS

Figure 1:
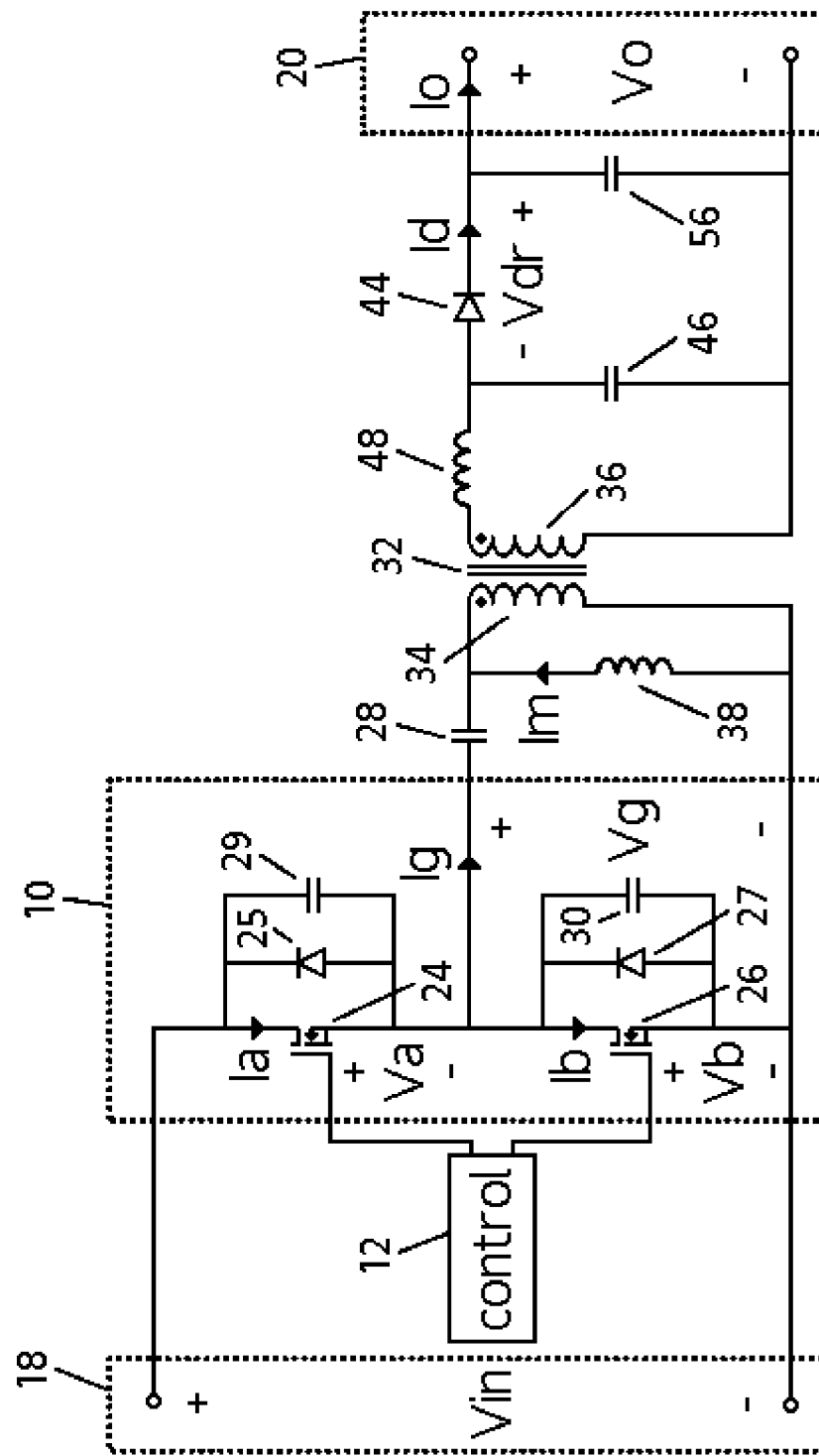
FIG. 1 is a circuit diagram of a DC/DC power converter in accordance with embodiments of the present invention.

The terminology used herein is for the purpose of describing particular embodiments only and is not intended to be limiting of the disclosure. Although particular features may be described with reference to one or more particular embodiments and/or drawings, it should be understood that such features are not limited to usage in the one or more particular embodiments or drawings with reference to which they are described, unless expressly specified otherwise. It will be also understood that the use of any and all examples, or exemplary language (e.g., "such as") provided herein, does not limit the scope of the disclosure.

It will be further understood that, although the terms first, second, etc. may be used herein to describe various elements, these elements should not be limited by these terms. These terms are only used to distinguish one element from another. Any description, of certain embodiments as "preferred" embodiments, and other recitation of embodiments, features, or ranges as being preferred, or suggestion that such are preferred, is not deemed to be limiting the scope of the disclosure. The abstract is submitted with the understanding that it will not be used to interpret or limit the scope of the disclosure.

As used herein, the singular forms "a", "an" and "the" are intended to include the plural forms as well, unless the context clearly indicates otherwise. As used herein, the terms "comprising", "having", "including", and "containing" are to be construed as open-ended terms. As used herein the term "and/or" includes any and all combinations of one or more of the associated listed items.

When two components are referred to as being "connected", it means that there are no components electrically between the components, the insertion of which materially affect the function or functions provided by the DC/DC power converter. For example, two components can be referred to as being connected, even though they may have a negligible DC impedance (e.g. sense resistor, current transformer etc.) between them which does not materially affect the function or functions provided by the device; likewise, two components can be referred to as being connected, even though they may have an additional electrical component between them which allows the DC/DC power converter to perform an additional function, while not materially affecting the function or functions provided by a DC/DC power converter which is identical except for not including the additional component; similarly, two components which are directly connected to each other, or which are directly connected to opposite ends of a wire or a trace on a circuit board or another medium, are connected. In contrast, when two components are referred to as being "coupled", it means that the two components are either connected, or that there is at least one passive component intervening between the two components.

The term "capacitor" as used herein should be understood broadly as any component, including one or more elements, with a capacitive property. As such, the term "capacitor" may be used to refer to a lumped capacitive element and/or to a distributed capacitive element. Similarly, the term "inductor" as used herein should be understood broadly as any component, including one or more elements, with an inductive property. As such, the term "inductor" may be used to refer to a lumped inductive element and/or to a distributed inductive element.

FIG. 1 shows a circuit of a DC/DC power converter, having input terminals 18 for receiving an input voltage Vin, and output terminals 20 for outputting a DC output voltage Vo. A DC output current Io may be drawn, if an output load (not shown) is connected across output terminals 20. Thus, the output power of the DC/DC power converter is the product of the DC output voltage Vo and the DC output current Io. Typically being variable, the input voltage Vin may be received, for example, from a power factor correction stage. Other sources for the input voltage Vin include, but not limited to, a battery voltage, a solar cell voltage etc.

A pulse wave generator 10 is connected to input terminals 18 and includes a plurality of switches that are arranged in a bridge configuration, for generating a pulse wave voltage. Typically, pulse wave generator 10 can be a half bridge inverter, which includes a first switch 24 and a second switch 26. Switches 24 and 26 may have diodes 25 and 27 placed across them, respectively. If switches 24 and 26 are MOSFETs (as shown in FIG. 1) then respective diodes 25 and 27 represent integral body diodes. Capacitors 29 and 30 represent inherent stray capacitances of switches 24 and 26, respectively. External snubber capacitors (not shown) may be added across switch 24 and switch 26 to reduce their turn-off switching losses.

Figure 7:
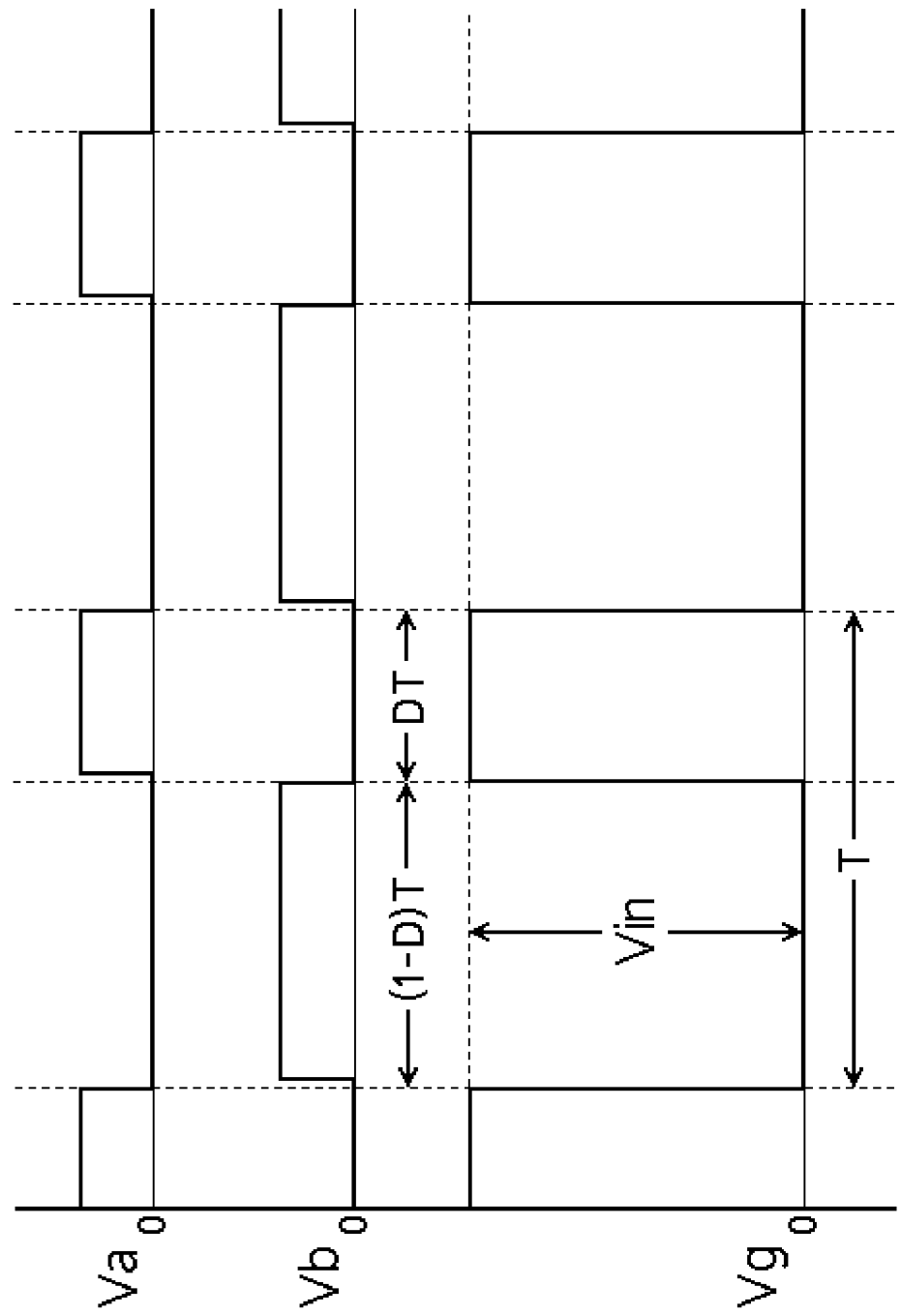
FIG. 7 shows timing diagrams illustrating drive signals transmitted by a control unit and a pulse wave voltage generated by a pulse wave generator.

A control unit 12 transmits drive signals Va and Vb to switches 24 and 26, respectively. Control unit 12 may include a PWM (Pulse Width Modulation) controller, which can be an analog and/or digital controller (for example ASIC, FPGA, etc.). As can be seen from FIG. 7, the drive signals Va and Vb are non-overlapping and complementary of each other, such that switch 24 is operated with a duty cycle D while switch 26 is operated with a duty cycle (1-D).

The drive signals Va and Vb do not necessarily have exact duty cycles D and (1-D), respectively. Between the fall transition of Vb and the rise transition of Va there can be a slight dead time for allowing diode 25 to conduct. Similarly, between the fall transition of Va and the rise transition of Vb there can be a slight dead time for allowing diode 27 to conduct. Thus, switches 24 and 26 switch on and off in a complementary manner, generating a pulse wave voltage Vg across switch 26. Assuming that switches 24 and 26 are ideal and that the forward voltages of diodes 25 and 27 are negligible, the pulse wave voltage Vg equals to the input voltage Vin when switch 24 is on and switch 26 is off, and equals to zero volts when vice versa. Thus, the pulse wave voltage Vg is a pulse wave voltage waveform with a period T, a duty cycle D and a peak-to-peak amplitude that is approximately equal to the input voltage Vin. As will be shown later, pulse wave generator 10 can also be a full bridge inverter, which can be configured to generate a pulse wave voltage with identical period T and identical duty cycle D, but with a peak-to-peak amplitude that is approximately equal to twice the input voltage Vin. As a consequence, a generated current Ig is being drawn from pulse wave generator 10.

In a typical operation of switches 24 and 26, the period T is fixed by control unit 12, causing the instantaneous frequency of pulse wave generator 10 to be constant. Nonetheless, control unit 12 may apply a frequency spreading operation, under which the instantaneous frequency of pulse wave generator 10 varies within a constant frequency range. Thus, the expression "constant frequency" as used herein with regards to the plurality of switches, means either fixing the period T, or applying frequency spreading operation. Due to the internal resistances of switches 24 and 26, forward voltages of diode 25 and diode 27 and/or external impedances that may be present, the peak-to-peak amplitude of the pulse wave voltage Vg may deviate (within ±1%) from being exactly equal to the input voltage Vin, and thus the expression "approximately equal" as used herein should be understood to encompass such deviation. Furthermore, the total combined rise and fall time of the pulse wave voltage Vg may be prolonged up to 50% of the period T, due to the stray capacitances of switches 24 and 26 and/or external snubber capacitors that may be present, and thus it should be understood that the term "pulse wave voltage" as used herein is intended to encompass such prolonging.

Referring to FIG. 1, the DC/DC power converter further includes a DC blocking capacitor 28, a transformer 32, a magnetizing inductor 38, a resonant inductor 48, a resonant capacitor 46, a rectifier 44 and a filter capacitor 56. Transformer 32 includes a primary winding 34 and a secondary winding 36, which are magnetically coupled to each other. The turn ratio of transformer 32, denoted by N, is the ratio of the number of turns of primary winding 34 to the number of turns of secondary winding 36. Although FIG. 1 shows that resonant inductor 48 is connected in series with secondary winding 36, resonant inductor 48 can be connected in series with primary winding 34. Thus, resonant inductor 48 can be an external component or implemented as the leakage inductance of transformer 32. Furthermore, additional resonant inductors may be connected in series with secondary winding 36. Although FIG. 1 shows that resonant capacitor 46 is connected in parallel with the series connection of filter capacitor 56 and rectifier 44, resonant capacitor 46 can be connected in parallel with rectifier 44. Thus, resonant capacitor 46 can be an external component or implemented as the inherent stray capacitance of rectifier 44. DC blocking capacitor 28 is coupled in series with primary winding 34 to block the DC component of the pulse wave voltage Vg from transformer 32. Magnetizing inductor 38 is connected in parallel with primary winding 34 and can be an external inductor or implemented as the magnetizing inductance of transformer 32.

The operation of rectifier 44 is similar to that in a class E low dv/dt resonant rectifier circuit. During off-state of rectifier 44, resonant capacitor 46 resonates with resonant inductor 48. At the turn-on transition of rectifier 44, the initial current through it rises in a step change. During conduction of rectifier 44, the voltage across resonant capacitor 46 is substantially constant. Minor ringing may occur due to the stray inductance of rectifier 44 during its conduction. The turn-off transition of rectifier 44 is at low dv/dt and under zero current switching (ZCS) condition. Although FIG. 1 shows a diode serving as a rectifier 44, a switch such as a MOSFET can be operated in a synchronous rectification for serving as rectifier 44. Filter capacitor 56 is connected in series with rectifier 44 and connected in parallel with output terminals 20, to smooth the voltage ripple of the DC output voltage Vo.

Figure 10:
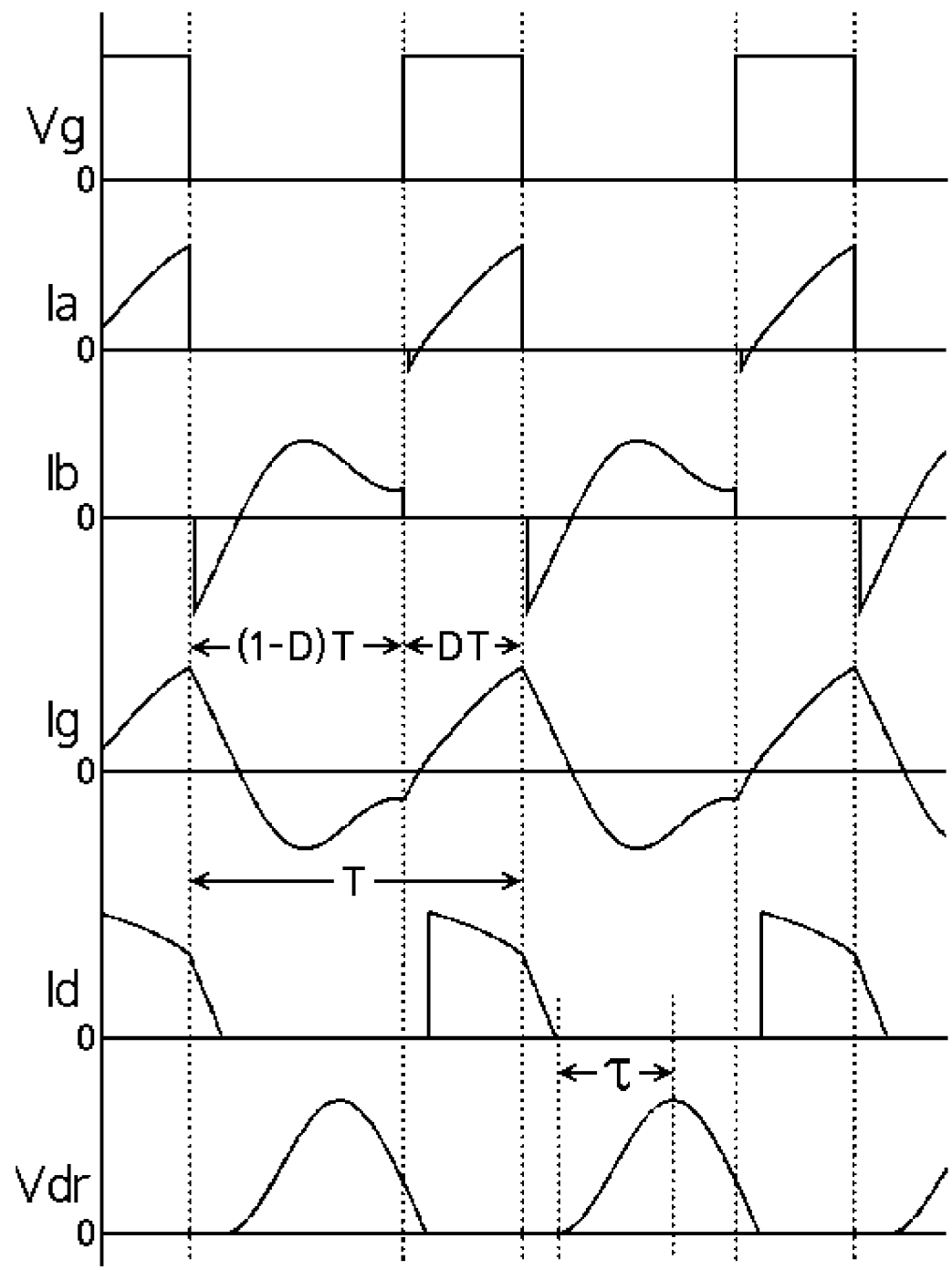
FIG. 10 shows timing diagrams illustrating an operation mode of the DC/DC power converter according to embodiments of the present invention.

FIG. 10 shows waveforms illustrating the operation of the DC/DC power converter according to embodiments of FIG. 1. The first (top) waveform of FIG. 10 shows the pulse wave voltage Vg across switch 26. The second and third waveforms of FIG. 10 show the currents Ia and Ib passing through switches 24 and 26, respectively. The fourth waveform of FIG. 10 shows the generated current Ig that is drawn from pulse wave generator 10. The fifth waveform of FIG. 10 represents the current Id passing through rectifier 44. The sixth (bottom) waveform of FIG. 10 represents the reverse voltage Vdr across rectifier 44.

The operation mode of the DC/DC power converter according to embodiments of FIG. 1 will now be described with reference to FIG. 10. The turn-off transition of rectifier 44 initiates a half resonant interval, denoted by $\tau$. During this half resonant interval, resonant capacitor 46 discharges and the reverse voltage Vdr across rectifier 44 rises resonantly. At the end of the half resonant interval, the reverse voltage Vdr reaches a ringing peak and starts to fall resonantly, as resonant capacitor 46 starts to recharge. While the reverse voltage Vdr is strictly and resonantly falling from its ringing peak, the pulse wave voltage Vg rises to the level of Vin, triggering faster charging of resonant capacitor 46 until the turn-on transition of rectifier 44. Assuming that the forward voltage of rectifier 44 is negligible, the reverse voltage Vdr is equal to zero volts during conduction interval of rectifier 44. While rectifier 44 conducts, the pulse wave voltage Vg falls back to zero volts, triggering the fall of the current Id until the turn-off of rectifier 44.

As can be seen from FIG. 10, the reverse voltage Vdr across rectifier 44 is characterized by a ringing peak, caused by the resonance of resonant inductor 48 with resonant capacitor 46. In contrast, a full bridge rectifier typically clamps the peak level of the reverse voltage across the rectifying elements to the level of the output voltage. Nonetheless, the full bridge and/or other rectifier circuits can be additionally incorporated with tertiary windings, for providing an auxiliary power. This auxiliary power can be used, for example, to activate control unit 12 and/or switches 24 and 26. If provided, such auxiliary is comparably negligible to the output power that rectifier 44 provides, and thus have no effect on the ringing peak of the reverse voltage Vdr.

As can also be observed from FIG. 10, the near-linear waveform of the generated current Ig during conduction of rectifier 44 is attributed to DC blocking capacitor 28, which decouples the DC component of the pulse voltage Vg without participating in resonance. Thus, for embodiments of FIG. 1, the half resonant interval $\tau$ and a characteristic impedance Z can be given by:

$$\tau \approx \pi \times \sqrt{C_r L_r}$$

$$Z \approx \sqrt{L_r/C_r}$$

Figure 11:
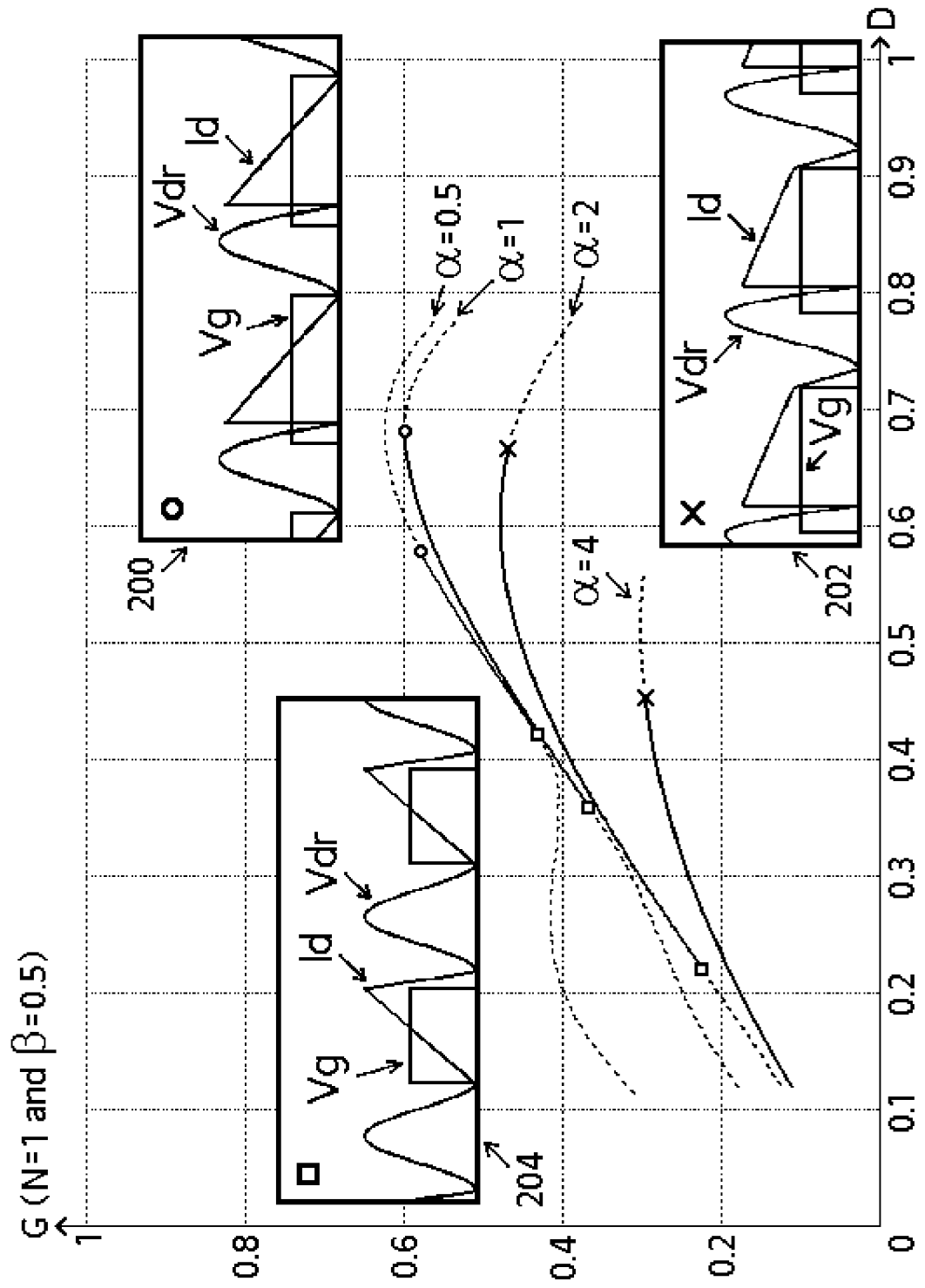
FIG. 11-13 illustrate the limits of the operation mode.
Figure 12:
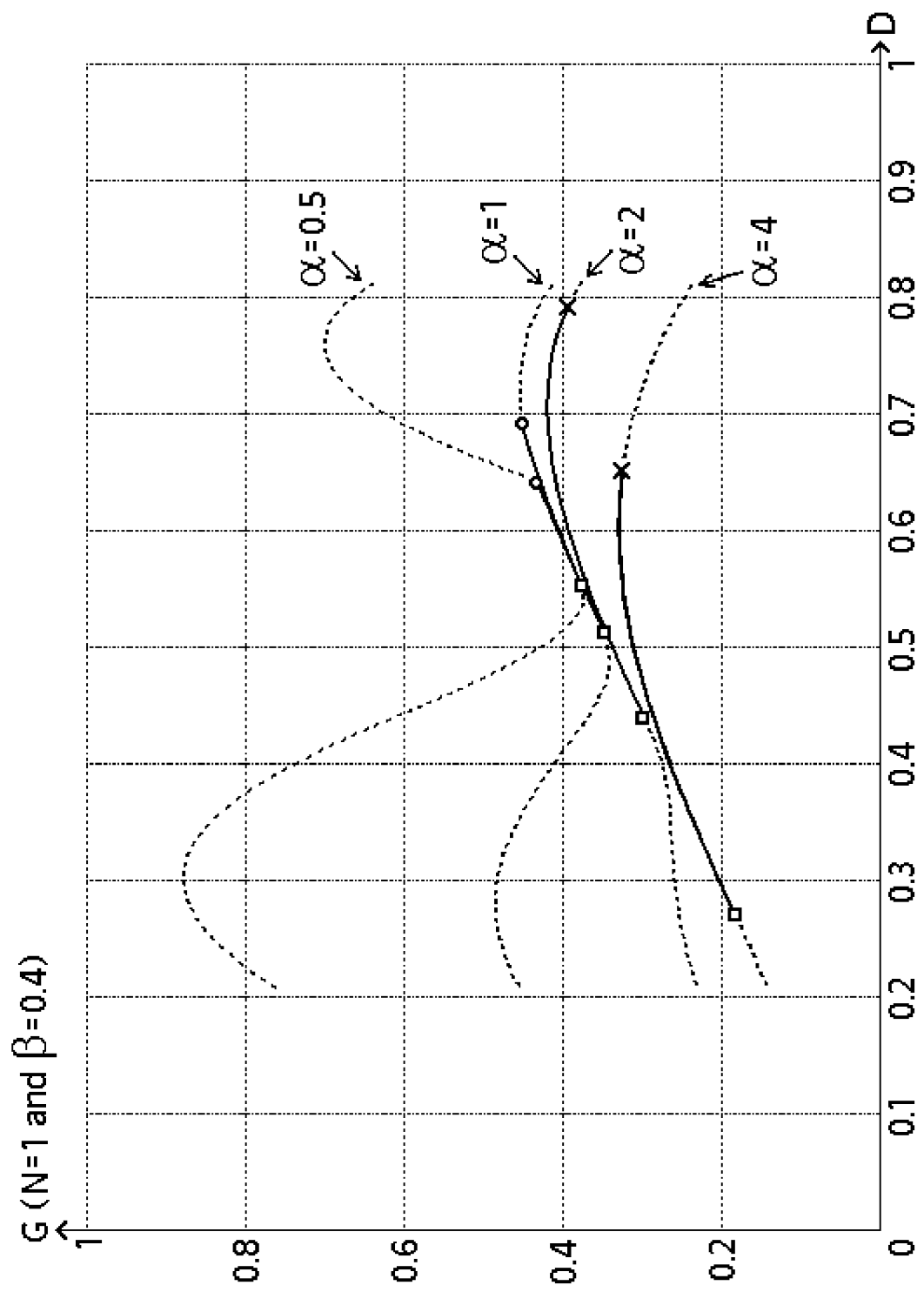
Figure 13:
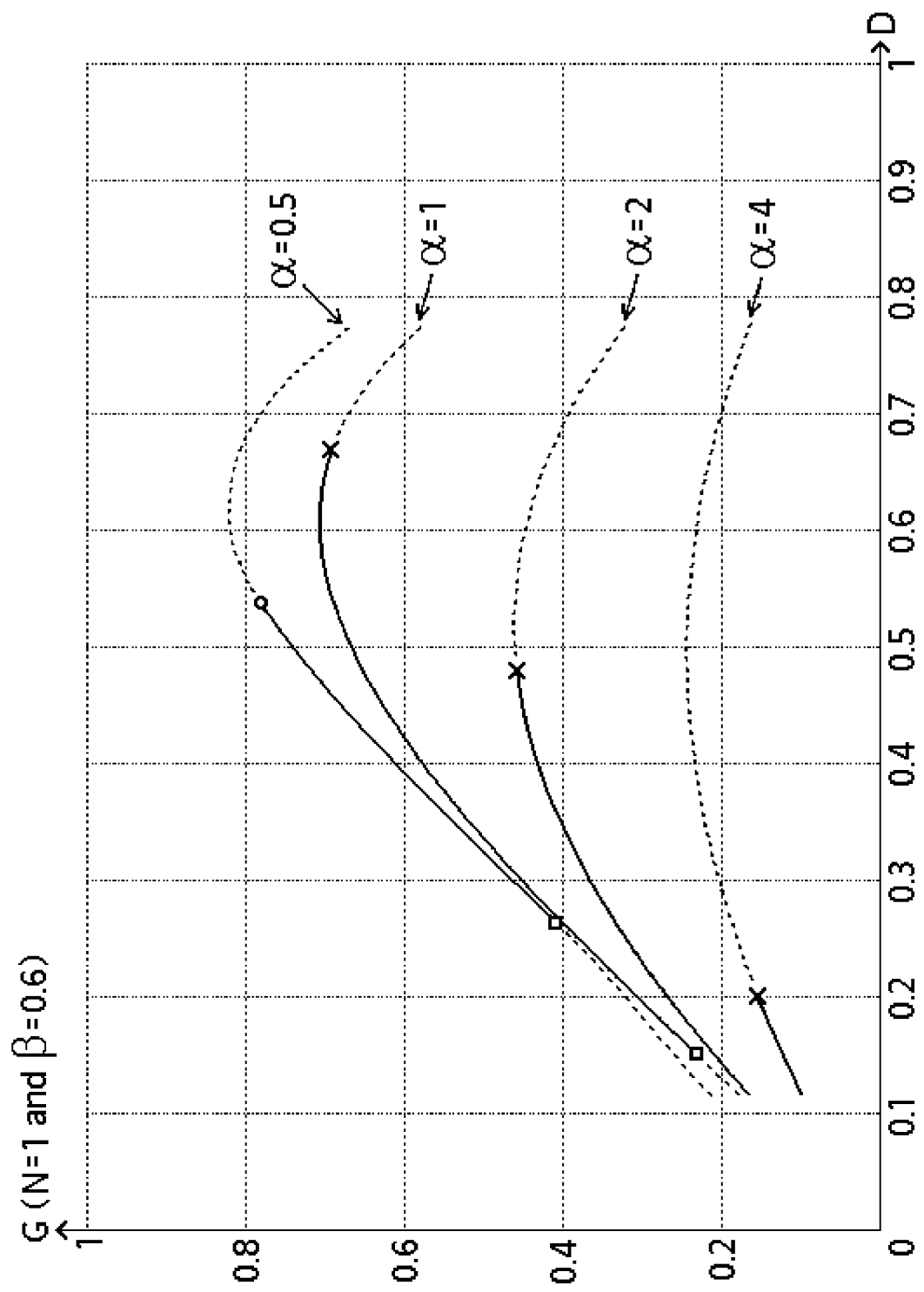

Lr is the inductance of resonant inductor 48 and Cr is the capacitance of resonant capacitor 46. Further defined herein are three variables $\alpha$, $\beta$ and G:

$$\alpha = ZI_o/V_o$$

$$\beta = 2\tau/T$$

$$G = V_o/V_{in}$$

where G is in fact, the voltage gain of the DC/DC power converter. FIG. 11 illustrates the boundaries of the operation mode by plotting curves of the voltage gain G as a function of the duty cycle D. For $\beta=0.5$ and N=1, each curve in FIG. 11 represents a different value of $\alpha$. At the points that are marked with circle, the fall transitions of the pulse wave voltage Vg occur just when rectifier 44 turns off (as shown in box 200). At the points that are marked with X, the rise transitions of the pulse wave voltage Vg occur just when the reverse voltage Vdr starts to fall (as shown in box 202). At the points that are marked with square, the rise transitions of the pulse wave voltage Vg occur just when the reverse voltage Vdr ends to fall (as shown in box 204). The dashed parts of the curves in FIG. 11 represent operating outside of the operation mode. FIG. 12 and FIG. 13 illustrate the limits of the operation mode for $\beta=0.4$ and $\beta=0.6$, respectively. As evident from FIG. 11, FIG. 12 and FIG. 13, either the DC output voltage Vo or the DC output current Io can be regulated against fluctuations of the output load and/or the input voltage Vin, by configuring control unit 12 to vary the duty cycle D within the duty cycle range in which the operation mode applies.

As shown in FIG. 11-13, the output power can reach a maximum when:

$$1-(\tau/T)>D>0.5$$

By decreasing the duty cycle D toward zero, the output power can be reduced. Therefore, the output power can effectively vary in positive correlation with the duty cycle D. That is, the output power can increase when the duty cycle D increases and vice versa. Upon regulating the DC output voltage Vo, two noticeable ramifications can be derived from this effect: (i) as the output power varies, the peak level of the reverse voltage Vdr also varies in positive correlation with the output power; and (ii) as the input voltage Vin varies and the output power remains constant, the peak level of the reverse voltage Vdr also remains substantially constant (within $\pm 10\%$), regardless of the duty cycle D. The peak level of the reverse voltage Vdr can be given by the following equation (only for embodiments of FIG. 1):

$$V_{dr(max)} \approx (2DV_{in}/N)+2V_o$$

As shown in FIG. 10, at the fall transitions of the pulse wave voltage Vg, rectifier 44 is conducting, the generated current Ig is positive and the sum of currents (Ig+Im) is positive; At the rise transitions of the pulse wave voltage Vg, the generated current Ig is negative, the current through resonant capacitor 46 is positive and the sum of currents (Ig+Im) is positive. Both switches 24 and 26 have conditions for their operation under ZVS, however, the condition for ZVS of switch 24 is harder to satisfy. For illustrating the condition for ZVS operation, further two variables $\gamma$ and $\delta$ are defined herein:

$$\gamma = GN$$

$$\delta = \frac{TV_oN^2}{2\pi L_m I_o}$$

Figure 14:
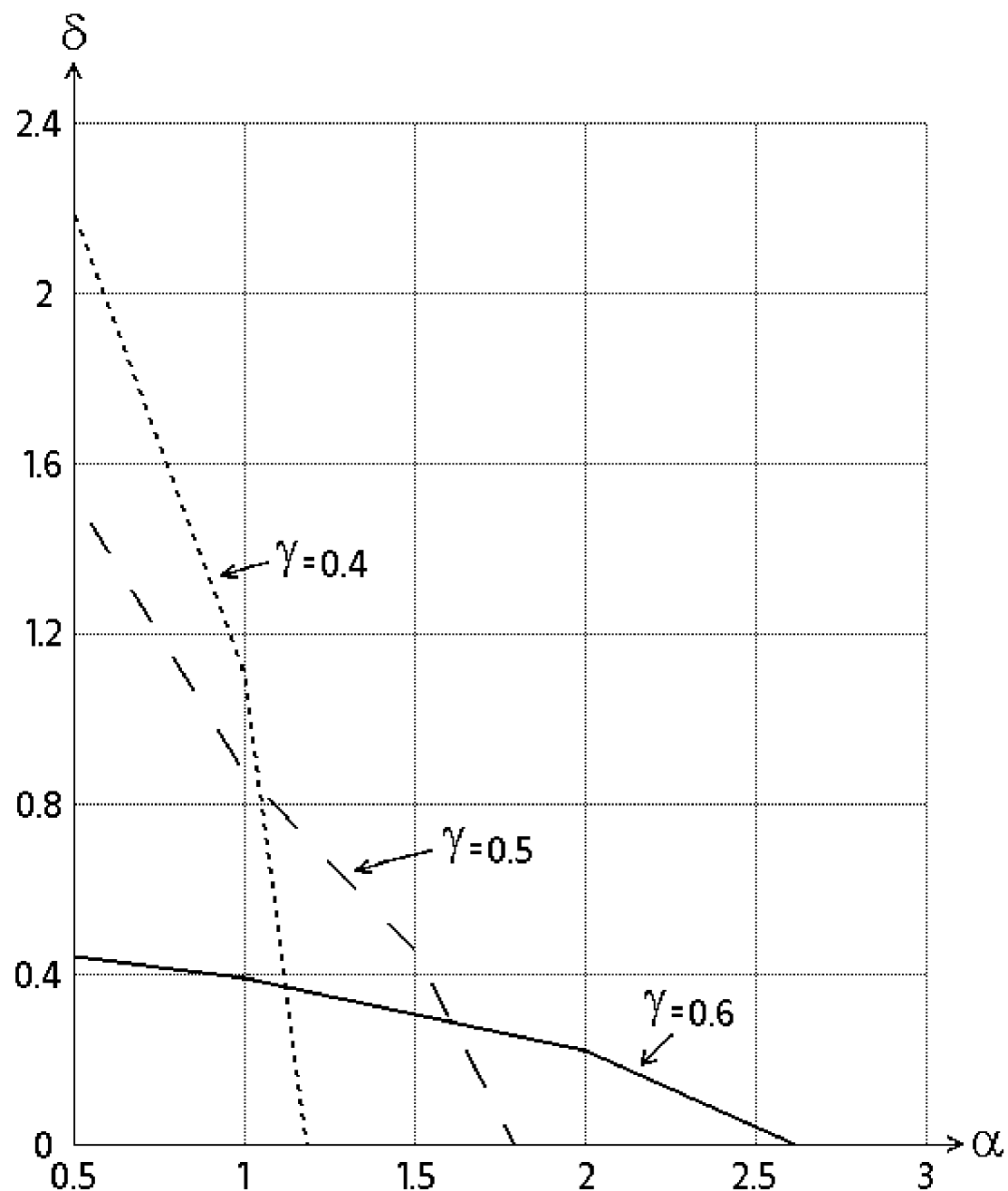
FIG. 14 illustrates curves representing thresholds for satisfying ZVS of switches in the pulse wave generator.

Lm is the inductance of magnetizing inductor 38. FIG. 14 illustrates curves of threshold values of $\delta$ as a function of $\alpha$, for satisfying ZVS condition of switches 24 and 26. The curves of FIG. 14, each representing different value of $\gamma$, refer only to embodiments of FIG. 1, and are only of approximation (within $\pm 20\%$).

The following empirical formula (only for embodiments of FIG. 1) is provided herein for satisfying ZVS condition of switch 24:

$$T \geq \left(\frac{P_{max}L_m}{NV_{in}V_o}\right) \times \left(\frac{45}{8^\varepsilon - 0.4}\right)$$

$$\varepsilon = \frac{Z}{(3V_o/2P_{max}) + \sqrt{[L_m \| (L_r N^2)]/C_b N^4}}$$

Cb is the capacitance of DC blocking capacitor 28 and Pmax is the maximum output power. In consideration that most magnetic cores have a finite magnetic energy storage capability, the inductance Lm of magnetizing inductor 38 is preferably small enough, such that its magnetic core doesn't fully saturates. The capacitance of DC blocking capacitor 28 may affect ZVS operation. If the ripple voltage (RMS) across DC blocking capacitor 28 is higher than the RMS value of the pulse wave voltage Vg, then ZVS operation of switches 24 and 26 may not be possible under all load and line conditions. Incorporation of snubber capacitors across switch 24 or switch 26 may have an undesired influence on ZVS operation.

The efficiency of the DC/DC power converter is influenced by the value of β. The closer β is to 1, the higher the voltage gain and the circulating currents from the resonance of resonant capacitor 46 and resonant inductor 48. The closer β is to 0, the higher the DC bias of magnetizing inductor 38, and the higher the voltage stress on rectifier 44. Therefore, a trade-off can be made between components sizes of the DC/DC power converter. Best mode of operation can be obtained when 0.2<β<0.9.

Figure 6:
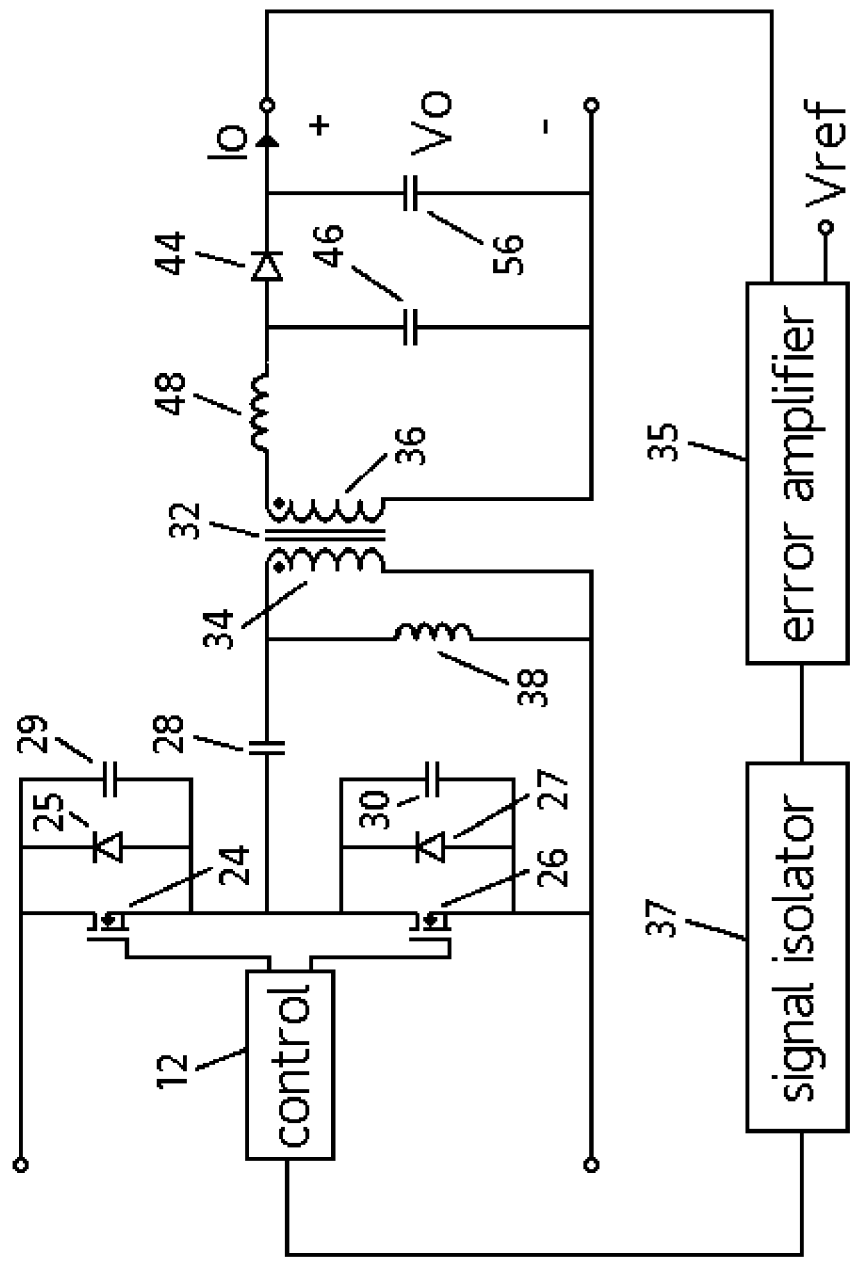
FIG. 6 is a circuit diagram of a DC/DC power converter with an exemplary feedback loop circuit for providing regulation, according to embodiments of the present invention.

Referring now to FIG. 6, shown is a feedback loop circuit for providing regulation. The feedback loop circuit may include an error amplifier 35 and a signal isolator 37. Error amplifier 35 can produce an error signal that is based on the difference between a reference voltage Vref and the DC output voltage Vo. The reference voltage Vref can be generated, for example, by an LDO regulator. The error signal can be either isolated by signal isolator 37 before being fed to the control unit 12, or fed directly to control unit 12. Signal isolator 37 can then be placed between control unit 12 and pulse wave generator 10, to isolate the drive signals Va and Vb.

Signal isolator 37 can be, for example, a signal transformer or an opto-coupler. Control unit 12 may include a triangle wave oscillator, a comparator and a digital inverter. The triangle wave oscillator can feed a triangle wave voltage into one input of the comparator, while the error signal can be fed into the other input of the comparator. As a result, the comparator can output a PWM signal. The PWM signal can be inverted by the digital inverter. Thus, the drive signals Va and Vb can be received from the PWM signal and the inverted PWM signal, respectively. The upper and lower limits on the excursion of the duty cycle D can be set, for example, by biasing and scaling the triangle wave voltage accordingly.

If control unit 12 is a digital controller, the feedback loop circuit may include an analog-to-digital converter (not shown) for converting the error signal into a digital signal, which then can be fed to control unit 12. For regulation of the DC output current Io, a sense resistor (not shown) may be connected in series with the output load. The voltage that is produced on the sense resistor can be fed to error amplifier 35. Frequency spreading can be implemented, for example, by incorporating a variable frequency oscillator, which can be used in conjunction with the comparator to provide such pulse frequency modulation. Dead time for ZVS operation can be set, for example, by feeding the drive signals Va and Vb through RCD networks.

An example according to embodiments of FIG. 1 will now be provided herein:
  DC output voltage: 12 V
  Maximum output power: 300 W
  Minimum input voltage: 400 V
  Maximum input voltage: 480 V
  Frequency of pulse wave generator: 200 kHz
  DC blocking capacitor: 1 µF
  Magnetizing inductor: 200 µH
  Resonant inductor: 380 nH
  Resonant capacitor: 420 nF
  Turn ratio of the transformer: 16:1
  Filter capacitor: 1 mF In the above example, the DC output voltage Vo can be regulated against fluctuations of the output power at the minimum input voltage, by varying the duty cycle D from 0.46 at 75 W, up to 0.6 at 300 W; While operating at the maximum output power, the DC output voltage Vo can be regulated against fluctuations of the input voltage by varying the duty cycle D from 0.6 at 400 V, down to 0.42 at 480 V.

Figure 2:
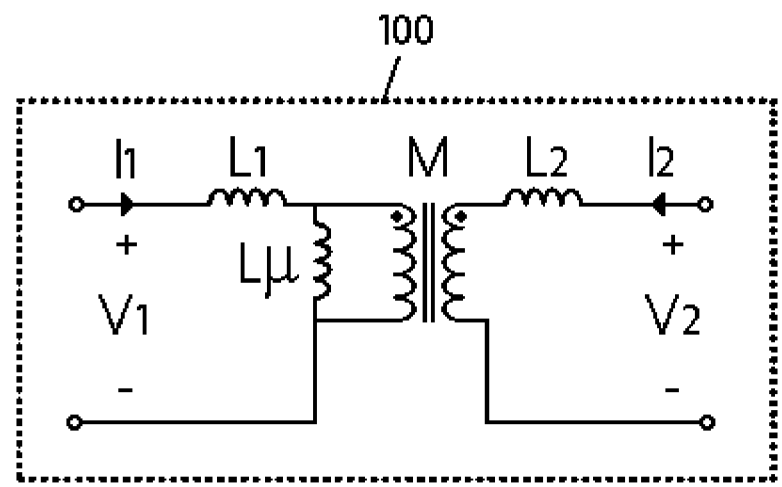
FIG. 2 shows an electrical-equivalent circuit of a pair of coupled inductors.

FIG. 2 shows an equivalent model 100 which is the electrical-equivalent circuit of a pair of coupled inductors. Equivalent model 100 comprises a parallel inductance Lµ, a primary series inductance L1, a secondary series inductance L2 and an ideal transformer having a turn ratio M. The two equations (in frequency domain) relating terminal voltages (V1 and V2) and terminal currents (I1 and I2) are given by:

$$\begin{vmatrix} V_1 \\ V_2 \end{vmatrix} = s \times \begin{vmatrix} L_\mu + L_1 & \frac{L_\mu}{M} \\ \frac{L_\mu}{M} & \left(\frac{L_\mu}{M^2}\right) + L_2 \end{vmatrix} \times \begin{vmatrix} I_1 \\ I_2 \end{vmatrix}$$

Since these two equations contain four variables (L1, L2, Lµ, and M), it is possible to derive an infinite number of specific equivalent models from equivalent model 100. Thus, the embodiments of FIG. 1 realize a specific equivalent model, in which the primary series inductance L1 is set to zero.

Figure 3:
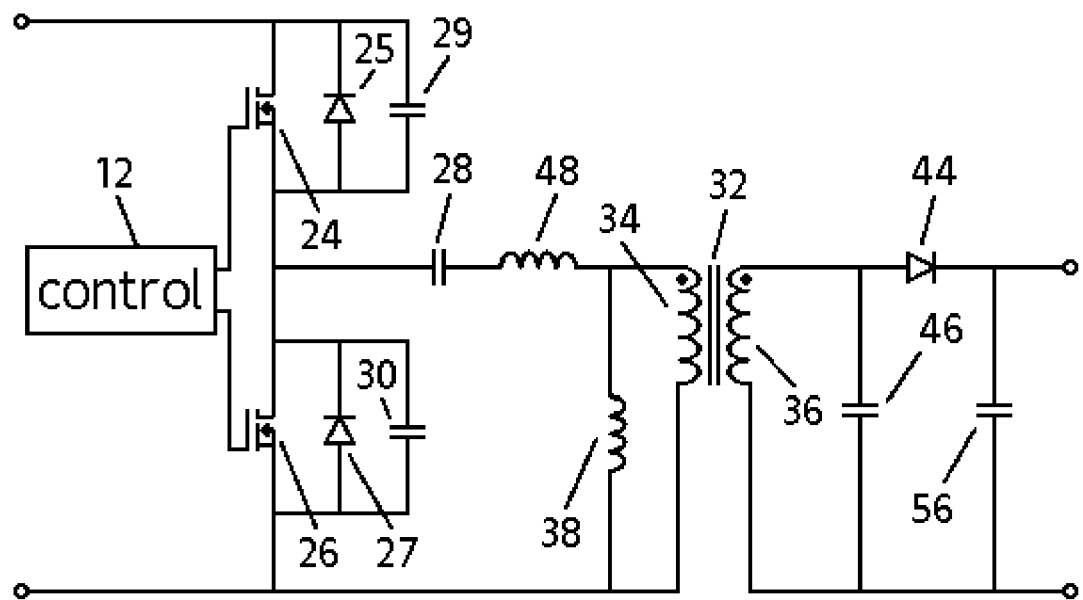
FIGS. 3-5 are circuit diagrams of DC/DC power converters in accordance with embodiments of the present invention.

FIG. 3 shows a DC/DC power converter according to embodiments, in which resonant inductor 48 is connected in series with primary winding 34. Additional resonant inductors may be connected in series with primary winding 34. The embodiments of FIG. 3 realize another specific equivalent model, in which the secondary series inductance L2 is set to zero and thus can have the same terminal voltages and terminal currents as those of the embodiments of FIG. 1. For the embodiments of FIG. 3, the half resonant interval τ and the characteristic impedance Z can be given by:

$$\tau \approx \pi \times \sqrt{C_r(L_m \| L_r)/N^2}$$

$$Z \approx \sqrt{(L_m \| L_r)/C_r N^2}$$

Figure 4:
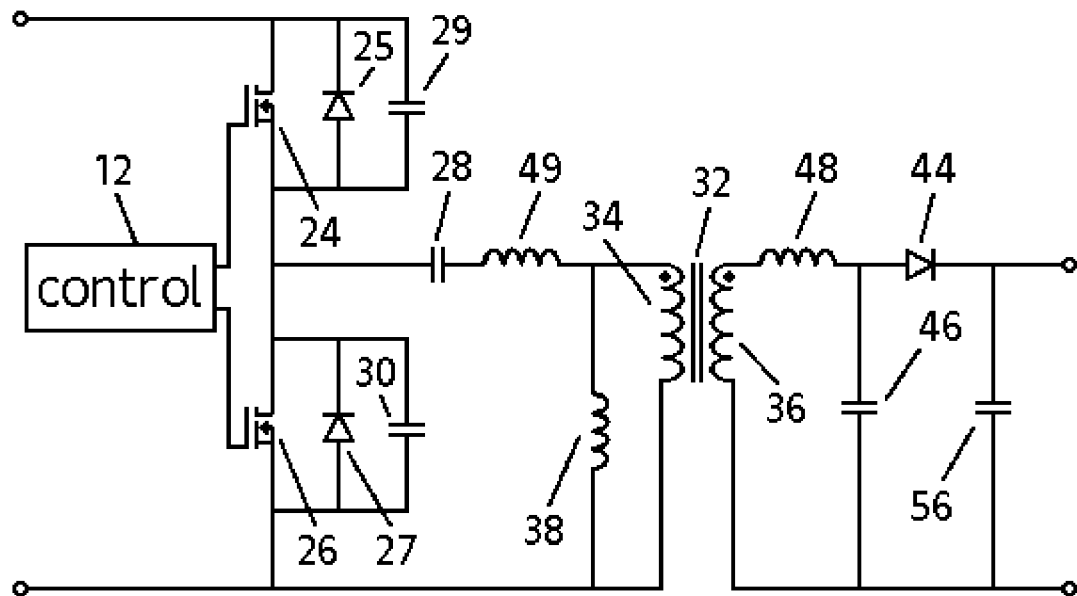

FIG. 4 shows a DC/DC power converter according to embodiments, in which a further resonant inductor 49 is connected in series with primary winding 34. Additional resonant inductors may be connected in series with primary winding 34 and/or secondary winding 34. The embodiments of FIG. 4 realize another specific equivalent model in which both the primary series inductance L1 and the secondary series inductance L2 are non-zero. Thus, the embodiments of FIG. 4 can have the same terminal voltages and terminal currents as those of the embodiment of FIG. 1. For the embodiments of FIG. 4, the half resonant interval τ and the characteristic impedance Z can be given by:

$$\tau \approx \pi \times \sqrt{[C_r(L_m \| L_a)/N^2] + C_r L_r}$$

$$Z \approx \sqrt{[(L_m \| L_a)/C_r N^2] + L_r/C_r}$$

Figure 5:
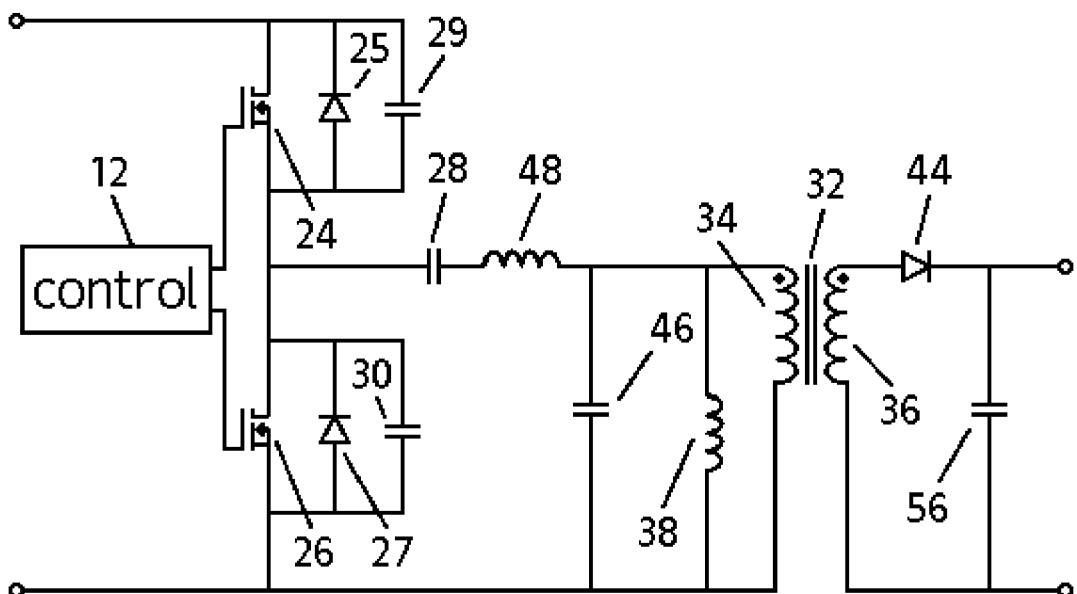

La is the inductance of further resonant inductor 49, which can be implemented as an external component or as the leakage inductance of transformer 32. FIG. 5 shows a DC/DC power converter according to embodiments, in which resonant inductor 48 is connected in series with primary winding 34 and resonant capacitor 46 is connected in parallel with primary winding 34. Thus, for the embodiments of FIG. 5, the half resonant interval τ and the characteristic impedance Z can be given by:

$$\tau \approx \pi \times \sqrt{C_r(L_m \| L_r)}$$

$$Z \approx \sqrt{(L_m \| L_r)/C_r}$$

Figure 8:
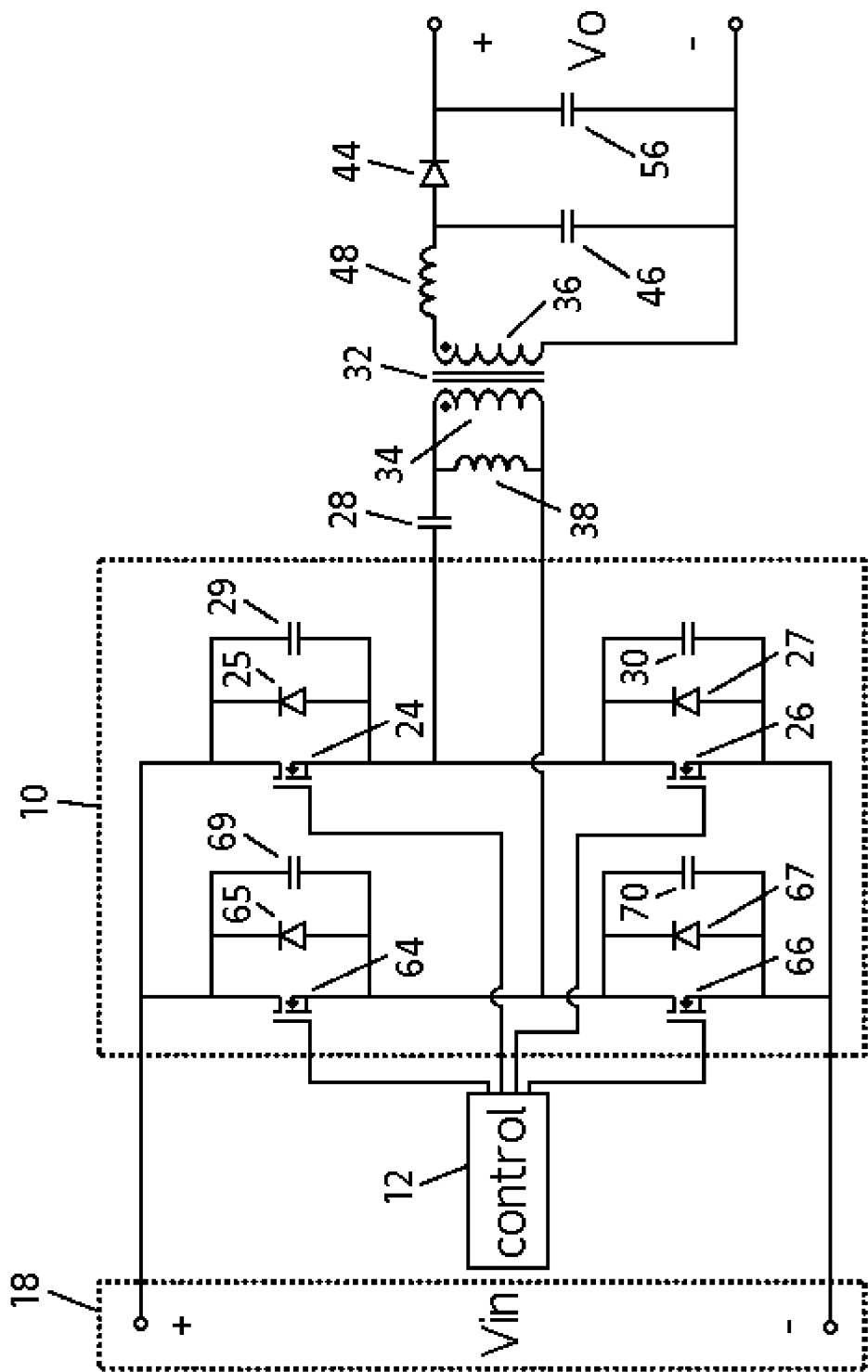
FIG. 8 is a circuit diagram of a DC/DC power converter having a full bridge inverter as a pulse wave generator, according to embodiments of the present invention.

FIG. 8 shows a DC/DC power converter according to embodiments, with a full bridge inverter serving as pulse wave generator 10. The full bridge inverter comprises further two switches 64 and 66, in addition to switches 24 and 26. Switches 64 and 66 may have diodes 65 and 67 placed across them, respectively. Capacitors 69 and 70 are the respective inherent stray capacitances of switches 64 and 66. Switch 66 turns on and off synchronously with switch 24, while switch 64 turns on and off synchronously with switch 26. Thus, pulse wave generator 10 can generate a pulse wave voltage with a peak-to-peak amplitude that is approximately twice as that of the pulse wave voltage Vg.

Figure 9:
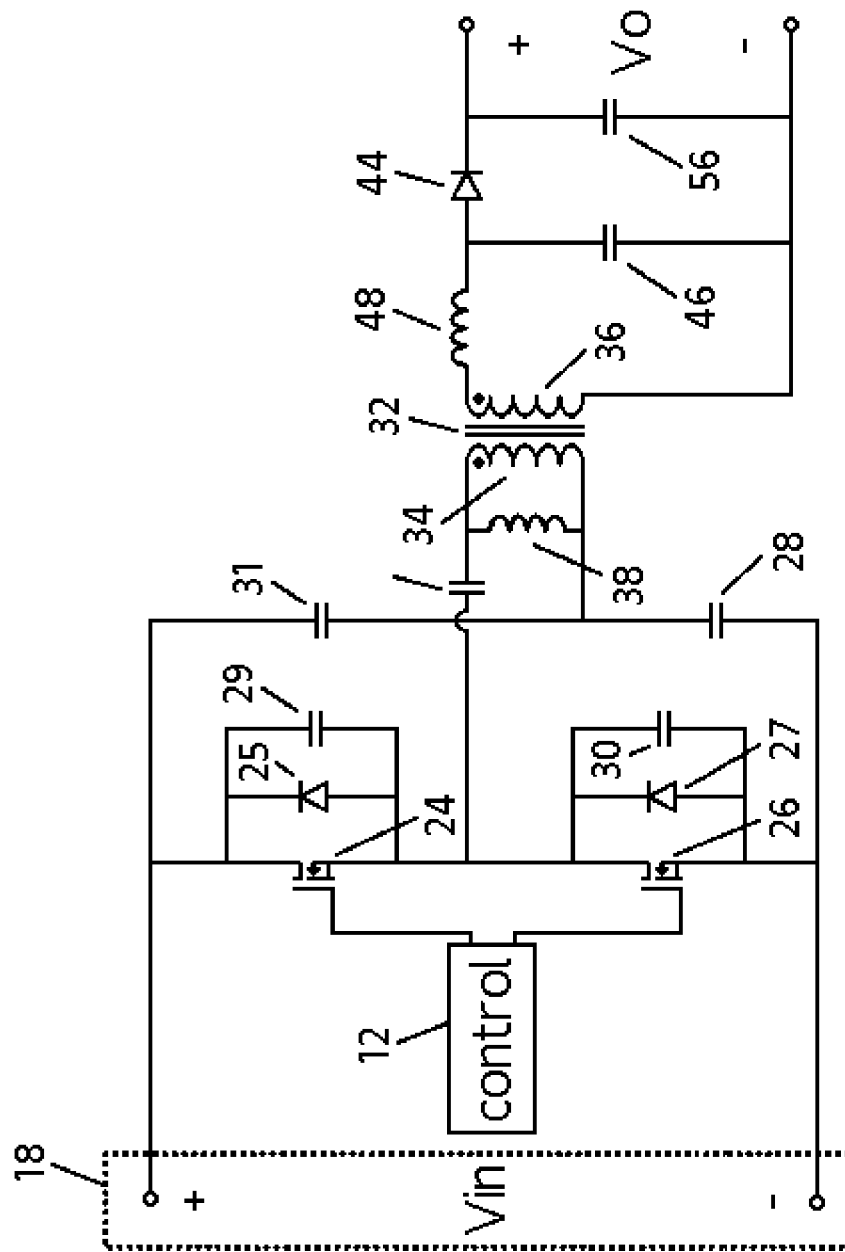
FIG. 9 is a circuit diagram of a DC/DC power converter having two DC blocking capacitors, according to embodiments of the present invention.

FIG. 9 shows a DC/DC power converter according to embodiments, having an additional DC blocking capacitor 31 being connected in series with DC blocking capacitor 28, while their series combination is connected in parallel with input terminals 18.

Figure 15:
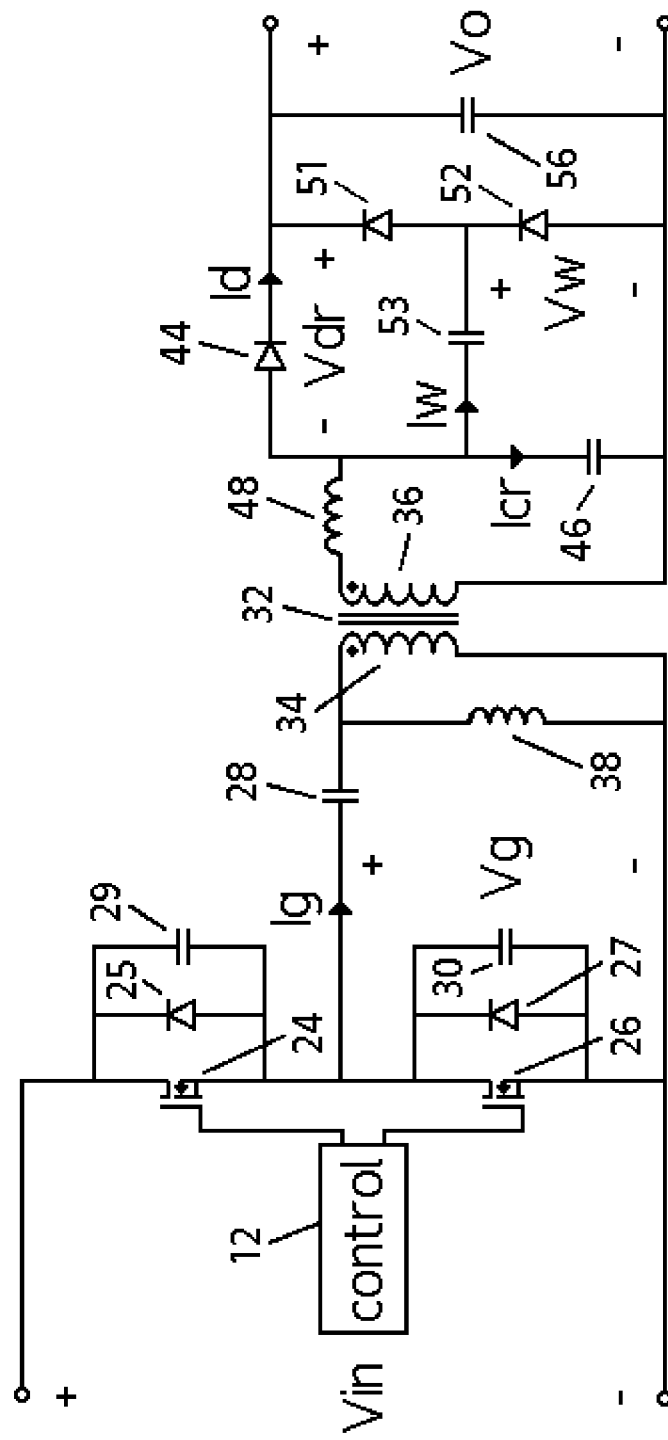
FIG. 15 is a circuit diagram of a DC/DC power converter with a voltage doubling circuit, according to embodiments of the present invention.

FIG. 15 shows a DC/DC power converter according to embodiments, which further includes a voltage doubling circuit, formed by a first doubling diode 51, a second doubling diode 52 and a doubling capacitor 53. Doubling capacitor 53 resonates with resonant inductor 48 when rectifier 44 is at off-state. Thus, the voltage doubling circuit provides further rectification, lowers the DC magnetization of magnetizing inductor 38 and reduces the peak level of the reverse voltage Vdr. In alternative configurations, additional snubber capacitors (not shown) can be also connected in parallel with first doubling diode 51 or in parallel with second doubling diode 52, thus either partially or wholly forming the capacitance of resonant capacitor 46. Alternatively, a voltage multiplier circuit can be included, by further cascading voltage doubling circuits.

Figure 16:
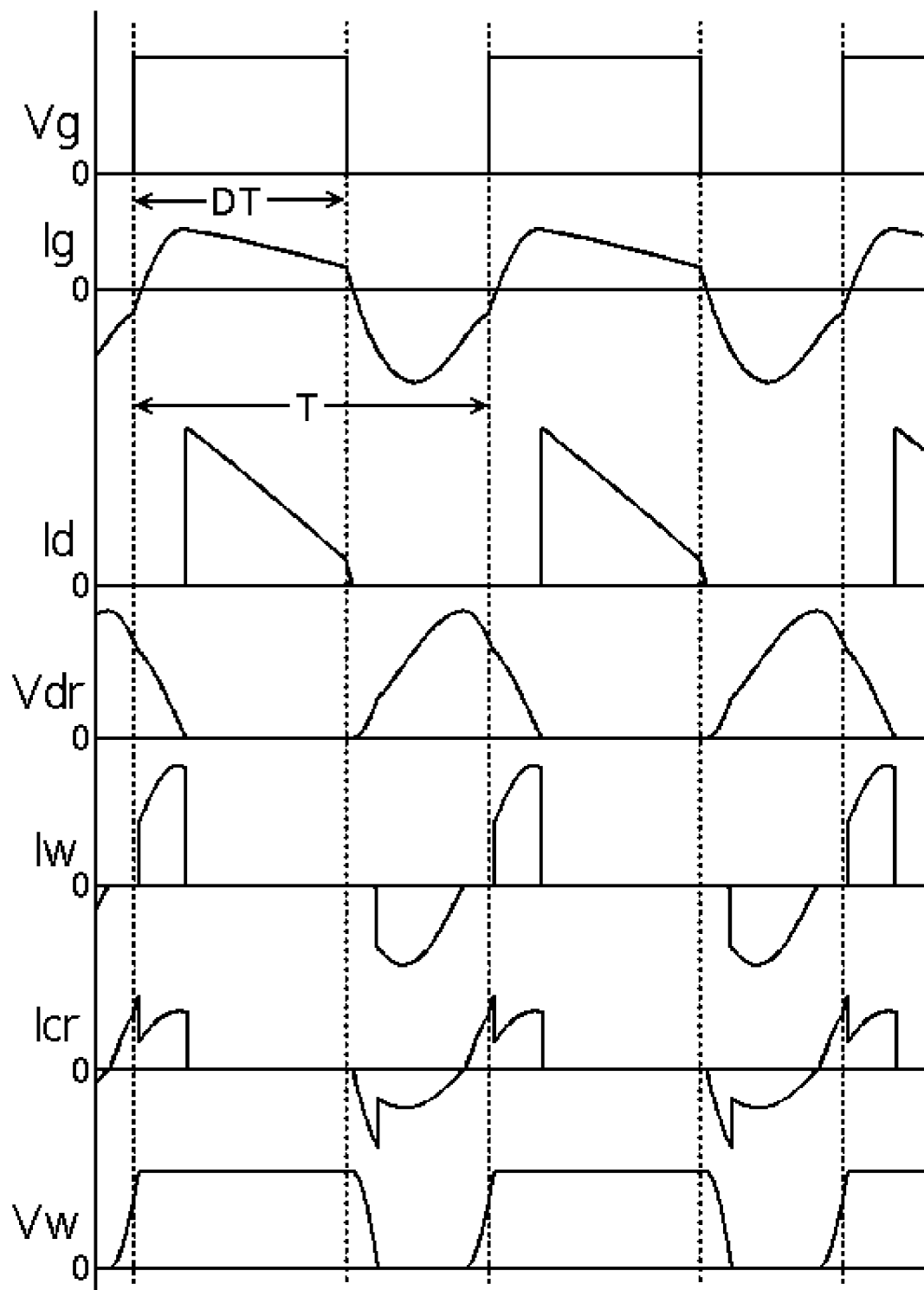
FIG. 16 shows timing diagrams illustrating the operation of a DC/DC power converter with a voltage doubling circuit, according to embodiments of the present invention. The following detailed description of embodiments of the invention refers to the accompanying drawings referred to above. Dimensions of elements and waveforms shown in the figures are chosen for convenience or clarity of presentation and are not necessarily shown to scale or indicate component specification values. Wherever possible, the same reference numbers will be used throughout the drawings and the following description to refer to same and like elements.

FIG. 16 shows waveforms that illustrate the operation of the DC/DC power converter of FIG. 15 at maximum output power. The first (top) waveform of FIG. 16 shows the pulse wave voltage Vg across switch 26. The second waveform of FIG. 16 shows the generated current Ig. The third waveform of FIG. 16 shows the current Id passing through rectifier 44. The fourth waveform of FIG. 16 shows the reverse voltage Vdr across rectifier 44. The fifth waveform of FIG. 16 shows the current Iw passing through doubling capacitor 53. The sixth waveform of FIG. 16 shows the current Icr passing through resonant capacitor 46. The seventh (bottom) waveform of FIG. 16 shows the reverse voltage Vw across second doubling diode 52.

Although the present invention may have been described in terms of the present embodiments, it will be understood that various modifications thereof are possible within the principles outlined above and will be evident to those skilled in the art, and thus the invention is not limited to the preferred embodiments but is intended to encompass such modifications.

I claim:

1. A DC/DC power converter comprising:
   input terminals;
   a pulse wave generator comprising of a plurality of switches being arranged in a bridge configuration across said input terminals and configured to generate a pulse wave voltage;
   a transformer comprising of a primary winding, a secondary winding and a magnetizing inductance;
   a resonant inductance in series with said primary winding;
   a DC blocking capacitor coupled in series with said primary winding, and their series combination is coupled to receive the pulse wave voltage;
   a filter capacitor connected in series with said secondary winding;
   a rectifier connected in parallel with the series combination of said filter capacitor and said secondary winding;
   a resonant capacitor connected either in parallel with said rectifier, or in parallel with said transformer;
   output terminals connected across said filter capacitor; and
   a control unit configured to operate the plurality of switches at a constant frequency and vary the duty cycle of the pulse wave voltage such that a fall transitions of the pulse wave voltage occur while said rectifier is conducting and a rise transitions of the pulse wave voltage occur while a reverse voltage across said rectifier is resonantly falling from a ringing peak, thus causing an output power across said output terminals to decrease if the duty cycle decreases and to increase if the duty cycle increases.

2. The DC/DC power converter of claim 1, wherein said resonant inductance is a leakage inductance of the transformer.

3. The DC/DC power converter of claim 2, wherein said rectifier is a switch being operated as a synchronous rectifier.

4. The DC/DC power converter of claim 3, wherein the plurality of switches are connected as a half bridge inverter.

5. The DC/DC power converter of claim 3, wherein the plurality of switches are connected as a full bridge inverter.

6. The DC/DC power converter of claim 2, wherein said rectifier is a diode.

7. The DC/DC power converter of claim 6, further comprising a voltage doubling circuit.

8. The DC/DC power converter of claim 6, wherein the plurality of switches are connected as a full bridge inverter.

\* \* \* \* \*

UNITED STATES PATENT AND TRADEMARK OFFICE
CERTIFICATE OF CORRECTION

| | |
|---|---|
| PATENT NO. | : 11,404,959 B2 |
| APPLICATION NO. | : 17/339955 |
| DATED | : August 2, 2022 |
| INVENTOR(S) | : Tal Abramovici |

It is certified that error appears in the above-identified patent and that said Letters Patent is hereby corrected as shown below:

In the Claims

At Column 12, Claim number 1, Line number 37, please replace "a fall transitions" with "the fall transitions"

At Column 12, Claim number 1, Line number 39, please replace "a rise transitions" with "the rise transitions"

Signed and Sealed this
Thirtieth Day of August, 2022

Katherine Kelly Vidal
*Director of the United States Patent and Trademark Office*